(12) United States Patent
Miyoshi et al.

(10) Patent No.: US 8,730,939 B2
(45) Date of Patent: May 20, 2014

(54) WIRELESS TRANSMITTER, WIRELESS RECEIVER, AND PREAMBLE SEQUENCE GENERATION METHOD

(75) Inventors: Kenichi Miyoshi, Kanagawa (JP); Yoshiko Saito, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 247 days.

(21) Appl. No.: 13/258,996

(22) PCT Filed: Mar. 25, 2010

(86) PCT No.: PCT/JP2010/002129
§ 371 (c)(1),
(2), (4) Date: Sep. 22, 2011

(87) PCT Pub. No.: WO2010/109878
PCT Pub. Date: Sep. 30, 2010

(65) Prior Publication Data
US 2012/0014373 A1      Jan. 19, 2012

(30) Foreign Application Priority Data
Mar. 26, 2009   (JP) .................................. 2009-076751

(51) Int. Cl.
*H04W 56/00* (2009.01)

(52) U.S. Cl.
USPC ....................................................... 370/350

(58) Field of Classification Search
CPC ..... H04W 80/04; H04W 88/06; H04W 88/08; H04W 84/18; H04W 72/04; H04W 72/0446; H04W 72/0453; H04W 56/00; H04W 56/0045; H04W 7/2662; H04B 7/2125; H04B 7/2126; H04B 7/2621

USPC ......... 370/203, 474, 324, 328–330, 343, 350; 455/67.11; 375/260, 324, 343
See application file for complete search history.

(56) References Cited

U.S. PATENT DOCUMENTS

2005/0090202 A1 *   4/2005   Kim et al. ................... 455/67.11
2005/0105460 A1 *   5/2005   Suh et al. ....................... 370/203

(Continued)

FOREIGN PATENT DOCUMENTS

| JP | 9-8696 | 1/1997 |
| JP | 9-135232 | 5/1997 |

(Continued)

OTHER PUBLICATIONS

International Search Report dated Apr. 20, 2010.

*Primary Examiner* — Kwang B Yao
*Assistant Examiner* — Syed M Bokhari
(74) *Attorney, Agent, or Firm* — Dickinson Wright PLLC

(57) ABSTRACT

Provided is a wireless transmitter capable of accurately specifying the number of multiplexed streams and correctly decoding the data signals when a preamble sequence transmitted from any antenna of a wireless transmitter is detected. In this device, a multiplex count determination unit (101) determines the number of streams used by the device itself from the same number of candidates as the number of spatially multiplexed streams. A sequence group generator (104) forms a plurality of preamble sequences into the same number of groups as the number of candidates, which is the number of streams. A sequence group selector (105) selects the group matching the number of streams determined by the multiplex count determination unit (101) from a plurality of groups. A preamble generator (106) selects the same number of preamble sequences as the number of streams in the group selected by the sequence group selector (105) and generates the preamble sequence used by the device itself.

9 Claims, 11 Drawing Sheets

(56) References Cited

U.S. PATENT DOCUMENTS

| | | | |
|---|---|---|---|
| 2005/0163264 A1* | 7/2005 | Nakao et al. | 375/343 |
| 2009/0016263 A1* | 1/2009 | Kishigami et al. | 370/328 |
| 2010/0061403 A1* | 3/2010 | Mueller | 370/474 |
| 2010/0091915 A1* | 4/2010 | Xu et al. | 375/343 |
| 2010/0172423 A1* | 7/2010 | Chrabieh | 375/260 |
| 2012/0236969 A1* | 9/2012 | Sadowsky | 375/324 |

FOREIGN PATENT DOCUMENTS

| | | |
|---|---|---|
| JP | 2005-244912 | 9/2005 |
| JP | 2007-214856 | 8/2007 |

* cited by examiner

FIG.3

Sequence Group #1: SEQUENCE (0) through SEQUENCE (9)
Sequence Group #2: SEQUENCE (10) through SEQUENCE (19)
Sequence Group #3: SEQUENCE (20) through SEQUENCE (29)
Sequence Group #4: SEQUENCE (30) through SEQUENCE (39)

FIG.7

| SEQUENCE GROUP #4 | { | SEQUENCE (30)<br>SEQUENCE (31)<br>SEQUENCE (32)<br>SEQUENCE (33)<br>SEQUENCE (34)<br>SEQUENCE (35)<br>SEQUENCE (36)<br>SEQUENCE (37)<br>SEQUENCE (38)<br>SEQUENCE (39) |
|---|---|---|
| SEQUENCE GROUP #3 | { | SEQUENCE (20)<br>SEQUENCE (21)<br>SEQUENCE (22)<br>SEQUENCE (23)<br>SEQUENCE (24)<br>SEQUENCE (25)<br>SEQUENCE (26)<br>SEQUENCE (27)<br>SEQUENCE (28)<br>SEQUENCE (29) |
| SEQUENCE GROUP #2 | { | SEQUENCE (10)<br>SEQUENCE (11)<br>SEQUENCE (12)<br>SEQUENCE (13)<br>SEQUENCE (14)<br>SEQUENCE (15)<br>SEQUENCE (16)<br>SEQUENCE (17)<br>SEQUENCE (18)<br>SEQUENCE (19) |
| SEQUENCE GROUP #1 | { | SEQUENCE (00)<br>SEQUENCE (01)<br>SEQUENCE (02)<br>SEQUENCE (03)<br>SEQUENCE (04)<br>SEQUENCE (05)<br>SEQUENCE (06)<br>SEQUENCE (07)<br>SEQUENCE (08)<br>SEQUENCE (09) |

WIRELESS TRANSMITTER, WIRELESS RECEIVER, AND PREAMBLE SEQUENCE GENERATION METHOD

TECHNICAL FIELD

The present invention relates to a radio transmission apparatus, a radio reception apparatus, and a preamble sequence generation method.

BACKGROUND ART

As a technique of large volume data communication, a technique in which a radio transmission apparatus spatially multiplexes and transmits a plurality of transmission data (streams) (e.g. Nmux streams, where Nmux≤Ntx) using a plurality of transmission antenna ports (e.g. Ntx antenna ports) has been studied. A radio reception apparatus spatially separates and receives received data in which the plurality of streams are mixed with each other on a propagation channel. Hereinafter, the number of streams spatially multiplexed by the radio transmission apparatus is referred to as "the number of multiplexed streams."

When the plurality of streams are spatially multiplexed using the plurality of antenna ports, it is assumed that preamble sequences for estimating channel quality between the antenna ports of the radio transmission apparatus and the antenna ports of the radio reception apparatus are multiplexed into data signals. In this case, the radio transmission apparatus assigns different preamble sequences for each stream. The radio reception apparatus detects the preamble sequences from the antenna ports of the radio transmission apparatus, and performs channel estimation between the antenna ports of the radio transmission apparatus and the antenna ports of the radio reception apparatus.

In addition, the radio reception apparatus needs to specify the number of multiplexed streams to separate the plurality of spatially multiplexed streams. The radio reception apparatus blindly detects the preamble sequences representing the number of multiplexed streams to specify the number of multiplexed streams, which has been studied (e.g. see Patent Literature 1). Specifically, first, the radio transmission apparatus and the radio reception apparatus share candidate data of used preamble sequences. The radio transmission apparatus fixedly assigns preamble sequences to the antenna ports of the radio transmission apparatus. In the radio transmission apparatus, an antenna port to which the preamble sequence corresponding to the number of multiplexed streams can be assigned is considered as a main antenna, and the antenna ports other than the main antenna are considered as sub-antennas. For example, the radio transmission apparatus assigns the preamble sequence of a sequence number L (i.e. the largest sequence number of used preamble sequences) corresponding to the number of multiplexed streams L to the main antenna. Hereinafter, the preamble sequence corresponding to the number of multiplexed streams is referred to as "main antenna preamble sequence."

The radio reception apparatus takes correlation between the candidate data of the preamble sequences shared with the radio transmission apparatus and the received preamble sequence, to blindly detect the preamble sequences. The radio reception apparatus specifies the preamble sequence of the largest sequence number from the blindly detected preamble sequences, as the main antenna preamble sequence, and the specified preamble sequence number L is referred to as the number of multiplexed streams. The radio reception apparatus estimates channel quality using the detected preamble sequence, and performs spatiotemporal decoding on the basis of the number of multiplexed streams L.

CITATION LIST

Patent Literature

PTL 1
Japanese Patent Application Laid-Open No. 2005-244912

SUMMARY OF INVENTION

Technical Problem

The channel quality between the radio transmission apparatus and the radio reception apparatus is different according to channels (i.e. for each antenna port). However, in the related art, the main antenna preamble sequence representing the number of multiplexed streams is only from one antenna (main antenna) of the radio transmission apparatus. Accordingly, when the channel quality of the channel between the main antenna of the radio transmission apparatus and the antenna of the radio reception apparatus is poor, the radio reception apparatus fails to detect the main antenna preamble sequence. In this case, the radio reception apparatus cannot correctly specify the number of multiplexed streams, and cannot decode the data signals normally.

An object of the invention is to provide a radio transmission apparatus, a radio reception apparatus, and a preamble sequence generation method, capable of reliably specifying the number of multiplexed streams and decoding the data signals normally, even when a preamble sequence transmitted from any antenna of the radio transmission apparatus is detected.

The radio transmission apparatus according to an exemplary embodiment of the invention includes: a determination section that determines the number of streams used by the radio transmission apparatus from candidates as the number of spatially multiplexed streams; a grouping section that groups a plurality of preamble sequences into the same number of groups as the number of candidates; a selection section that selects the group corresponding to the determined number of streams from the plurality of groups; and a generation section that selects the same number of preamble sequences as the number of streams in the selected group, and generates the preamble sequence used by the radio transmission apparatus.

The radio reception apparatus according to an exemplary embodiment of the invention includes: a detection section that detects a preamble sequence transmitted from a radio transmission apparatus; and a specification section that specifies the number of streams corresponding to a group including the detected preamble sequence from the same number of groups as the number of candidates as the number of spatially multiplexed streams obtained by grouping the plurality of preamble sequence into groups that are a plurality of groups corresponding to candidates of the number of streams, as the number of streams used by the radio transmission apparatus.

The preamble sequence generation method according to an exemplary embodiment of the invention includes: determining the number of streams used by a subject apparatus, from candidates of the number of spatially multiplexed streams; grouping a plurality of preamble sequences into the same number of groups as the number of candidates; selecting the group corresponding to the determined number of streams from the plurality of groups; and selecting the same number of preamble sequences as the number of streams in the selected group and generating the preamble sequence used by the subject apparatus.

SOLUTION TO PROBLEM

Advantageous Effects of Invention

According to the invention, it is possible to reliably specify the number of multiplexed streams and decode the data signals normally, even when the preamble sequence transmitted from any antenna of the radio transmission apparatus is detected.

BRIEF DESCRIPTION OF DRAWINGS

FIG. 3 is a diagram illustrating a sequence group according to Embodiment 1 of the invention;

FIG. 7 is a diagram illustrating a sequence group according to Embodiment 2 of the invention;

FIG. 11 is a diagram illustrating the other sequence group of the invention.

DESCRIPTION OF EMBODIMENTS

Exemplary embodiments of the invention will now be described with reference to the appended drawings.

Figure 1:
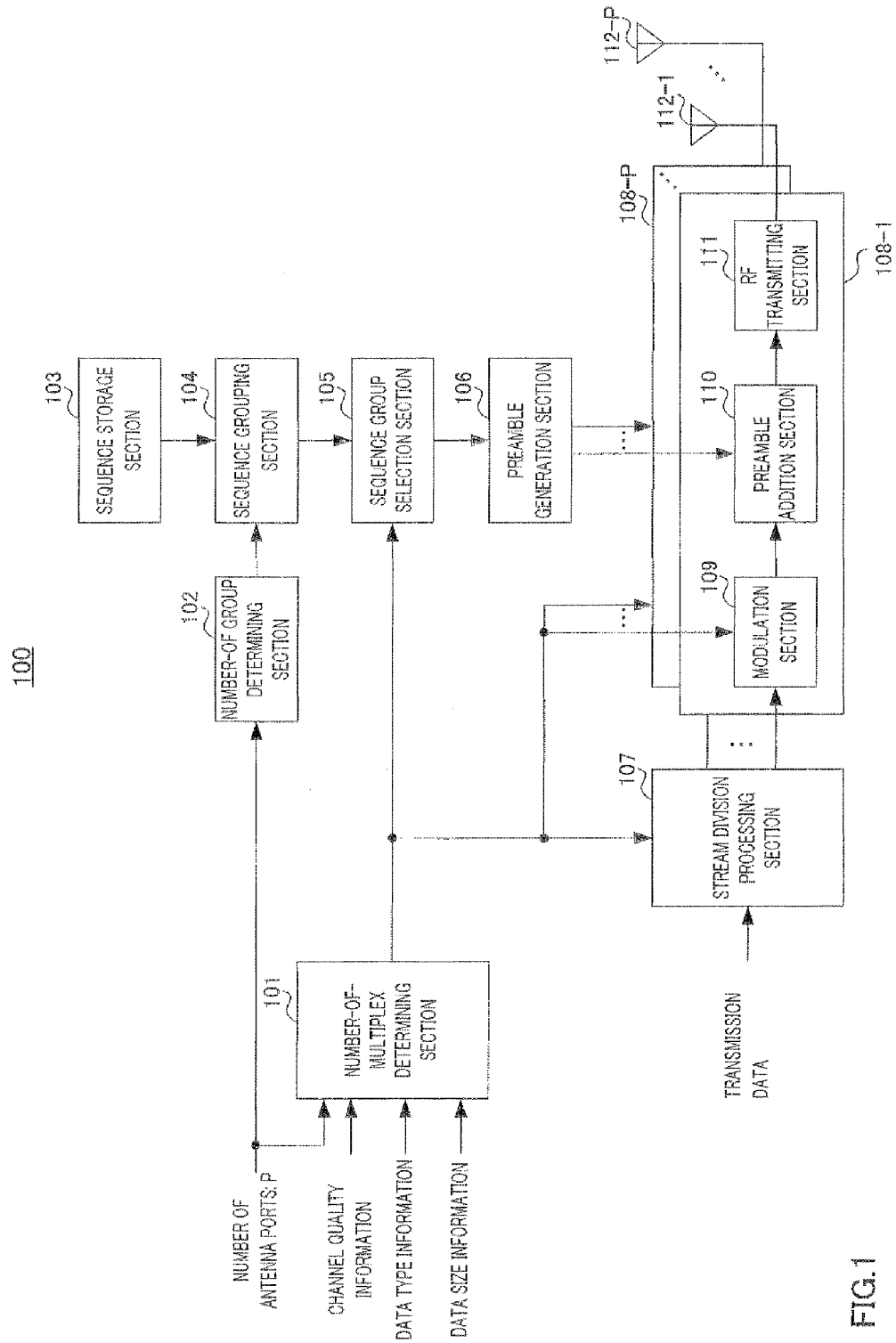
FIG. 1 is a block diagram illustrating a configuration of a radio transmission apparatus according to Embodiment 1 of the invention.

A configuration of radio transmission apparatus 100 according to an embodiment is shown in FIG. 1. In addition, radio transmission apparatus 100 shown in FIG. 1 performs spatial multiplexing using P antenna ports (antenna ports 112-1 to 112-P). Herein, the number of antenna ports P is the same as the number of candidates of the number of multiplexed streams. Candidate data of usable preamble sequences are shared in advance between radio transmission apparatus 100 and radio reception apparatus 200 to be described later.

In radio transmission apparatus 100 shown in FIG. 1, the number of antenna ports P used in the spatial multiplexing is input to number-of-multiplex determining section 101 and number-of-group determining section 102. Channel quality information representing channel quality of the antenna ports, data type information representing a type of transmission data, and data size information representing a data size of transmission data are input to number-of-multiplex determining section 101.

Multiplex determination section 101 determines the number of multiplexed streams L used by radio transmission apparatus 100 from the candidates of the number of multiplexed streams on the basis of the input number of antenna ports P, channel quality information, data type information, and data size information. In addition, the number of multiplexed streams L is equal to or less than the number of antennas P (i.e. the number of multiplexed streams L the number of antenna ports P). Number-of-multiplex determining section 101 outputs the determined number of multiplexed streams L to sequence group selection section 105, stream division processing section 107, and modulation sections 109 of transmission processing sections 108-1 to 108-P.

Number-of-group determining section 102 determines the number of sequence groups obtained by grouping the plurality of preamble sequences into groups on the basis of the input number of antenna ports P. Specifically, number-of-group determining section 102 determines the same number (herein, P) of candidates of the number of multiplexed streams, as the number of groups of the sequence groups. Number-of-group determining section 102 outputs the determined number of groups to sequence grouping section 104. In addition, herein, it is described that the number of antenna ports P and the number of candidates of the number of multiplexed streams are the same, but the number of candidates of the number of multiplexed streams may not be the same number as the number of antenna ports. For example, even when the number of antenna ports is four and when the number of multiplexed streams is limited to three candidates of 1, 2, and 4, number-of-group determining section 102 determines the number of groups as three.

Sequence storage section 103 stores candidate data of a plurality (e.g. N) of usable preamble sequences.

Sequence grouping section 104 groups the plurality of preamble sequences (candidate data) stored in sequence storage section 103 into the plurality of groups to generate a plurality of sequence groups, the number of groups (i.e. the same number as the number of candidates of the number of multiplexed streams) being input from number-of-group determining section 102. Herein, the sequence groups generated by sequence grouping section 104 correspond to the number of candidates of the number of multiplexed streams, respectively. Sequence grouping section 104 forms a preamble sequence set (hereinafter "sequence set") formed of the same number of preamble sequences as the number of multiplexed streams in which the preamble sequences in the generated sequence groups correspond to the sequence groups. Specifically, sequence grouping section 104 forms a sequence set including two preamble sequences in the sequence group corresponding to the number of multiplexed streams of 2, forms a sequence set of three preamble sequences in the sequence group corresponding to the number of multiplexed streams of 3, and forms a sequence set formed of four preamble sequences in the sequence group corresponding to the number of multiplexed streams of 4. Sequence grouping section 104 outputs the plurality of generated sequence groups to sequence group selection section 105.

Sequence group selection section 105 selects a sequence group corresponding to the number of multiplexed streams L input from number-of-multiplex determining section 101, from the plurality of sequence groups input from sequence grouping section 104. Sequence group selection section 105 outputs the selected sequence group to preamble generation section 106.

Preamble generation section 106 generates preamble sequences used by radio transmission apparatus 100 by selecting the same number of preamble sequences as the number of multiplexed streams L in the sequence group input from sequence group selection section 105. For example, preamble generation section 106 selects any one of the plurality of sequence sets in the sequence group, and generates the same number of preamble sequences as the number of multiplexed streams L. Preamble generation section 106 outputs the generated preamble sequences to preamble addition sections 110 of transmission processing sections 108-1 to 108-P. In addition, when the number of generated preamble sequences L is less than P (L<P), preamble generation section 106 outputs L preamble sequences to the transmission processing sections corresponding to the antenna ports used in the spatial multiplexing of transmission processing sections 108-1 to 108-P.

Stream division processing section 107 divides the input transmission data into a plurality of stream data of the number of multiplexed streams L input from number-of-multiplex determining section 101. Stream division processing section 107 outputs the plurality (L) of stream data to modulation sections 109 of transmission processing sections 108-1 to 108-P. In addition, when the number of stream data L is less than P (L<P), stream division processing section 107 outputs the L stream data to the transmission processing sections corresponding to the antenna ports used in the spatial multiplexing of transmission processing sections 108-1 to 108-P.

Transmission processing sections 108-1 to 108-P correspond to antenna ports 112-1 to 112-P. Each of transmission processing sections 108-1 to 108-P is provided with modulation section 109, preamble addition section 110, and RF transmitting section 111.

Hereinafter, an internal configuration of transmission processing sections 108-1 to 108-P will be described in detail.

Modulation section 109 modulates the stream data input from stream division processing section 107, and outputs the modulated stream data to preamble addition section 110.

Preamble addition section 110 adds the preamble sequence input from preamble generation section 106 to the header of the stream input from modulation section 109. Preamble addition section 110 outputs the stream data to which the preamble sequence is added to RF transmitting section 111.

RF transmitting section 111 performs a transmission process such as D/A conversion, amplification, and up-conversion on the stream data input from preamble addition section 110, and transmits the transmission-processed signals from antenna ports 112-1 to 112-P to radio reception apparatus 200. Accordingly, the plurality (L) of stream data is transmitted to radio reception apparatus 200.

Figure 2:
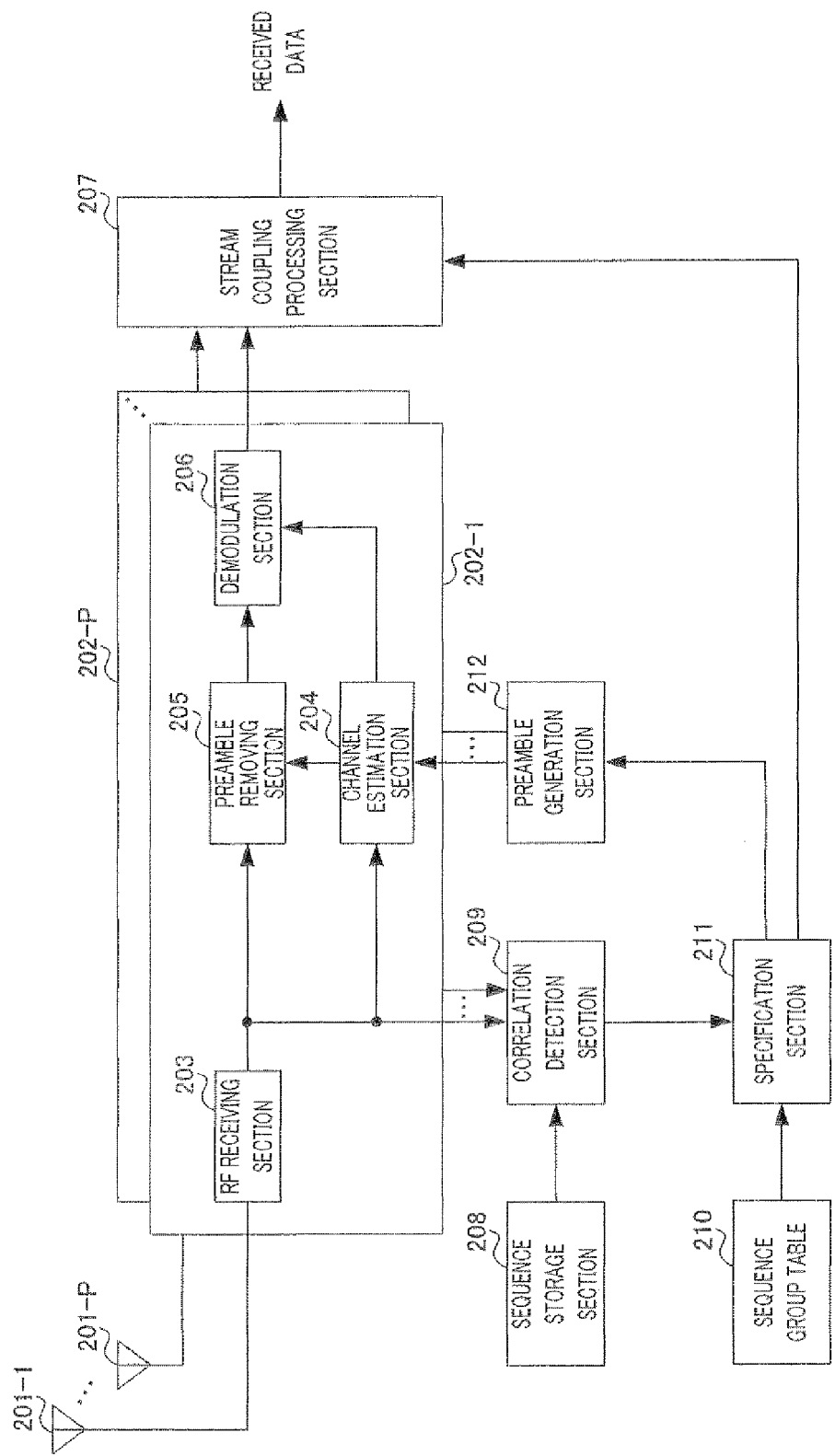
FIG. 2 is a block diagram illustrating a configuration of a radio reception apparatus according to Embodiment 1 of the invention.

Next, a configuration of radio reception apparatus 200 according to the embodiment is shown in FIG. 2.

In radio reception apparatus 200 shown in FIG. 2, reception processing sections 202-1 to 202-P correspond to antenna ports 201-1 to 201-P, respectively. Each of reception processing section 202-1 to 202-P is provided with RF receiving section 203, channel estimation section 204, preamble removing section 205, and demodulation section 206. Hereinafter, an internal configuration of reception processing section 202-1 to 202-P will be described in detail.

RF receiving section 203 performs a reception process such as down-conversion and A/D conversion on the reception signals input through antenna ports 201-1 to 201-P. RF receiving section 203 outputs the data signals included in the reception signals to preamble removing section 205, and outputs the preamble sequence (hereinafter referred to as "reception preamble sequence") to channel estimation section 204 and a correlation detection section 209.

Channel estimation section 204 performs channel estimation of each multi-path using the reception preamble sequence input from RF receiving section 203 and the preamble sequence (hereinafter referred to as "generation preamble sequence") input from preamble generation section 212. Channel estimation section 204 outputs the estimated channel estimation value to preamble removing section 205 and demodulation section 206.

Preamble removing section 205 removes the preamble sequence from the data signal input from RF receiving section 203 on the basis of the channel estimation value input from channel estimation section 204. Preamble removing section 205 outputs the data signal after the preamble sequence removal to demodulation section 206.

Demodulation section 206 demodulates the data signal input from preamble removing section 205 on the basis of the channel estimation value input from channel estimation section 204, and outputs the demodulated data signal to stream coupling processing section 207.

Stream coupling processing section 207 couples L (maximum P) data signals (stream data) input from each demodulation section 206 of reception processing sections 202-1 to 202-P, using the number of multiplexed streams L input from specification section 211, and outputs the coupled data as received data.

Meanwhile, sequence storage section 208 stores the same candidate data (e.g. N) of the preamble sequences as the candidate data of the preamble sequence stored in sequence storage section 103 of radio transmission apparatus 100.

Correlation detection section 209 takes correlation between the reception preambles sequence input from RF receiving sections 203 of reception processing sections 202-1 to 202-P and all the candidate data (N) of the preamble sequences stored in sequence storage section 208. Correlation detection section 209 detects the candidate data of the preamble sequence with the highest correlation value as the preamble sequence being transmitted from radio transmission apparatus 100. Correlation detection section 209 outputs the detected preamble sequence to specification section 211.

Sequence group table 210 stores a table representing the same sequence group as the sequence group generated by sequence grouping section 104 of radio transmission apparatus 100. That is, sequence group table 210 stores the plurality of sequence groups corresponding to the candidates of the number of multiplexed streams, which is the same number of sequence groups as the number of candidates of the number of multiplexed streams, and which is obtained by grouping the plurality of preamble sequences into the groups. Sequence group table 210 stores information representing the sequence sets which are set for the sequence groups.

Specification section 211 specifies the number of multiplexed streams L and the preamble sequences other than the preamble sequences detected by correlation detection section 209, with reference to the sequence groups stored in sequence group table 210, on the basis of the preamble sequences input from correlation detection section 209.

Specifically, specification section 211 specifies the number of multiplexed streams corresponding to the sequence group including preamble sequence input from correlation detection section 209 from the plurality of sequence groups stored in sequence group table 210, as the number of multiplexed streams L used by radio transmission apparatus 100. Specification section 211 specifies the preamble sequence in the relation between the preamble sequence input from correlation detection section 209 and the sequence set. Specification section 211 outputs the specified number of multiplexed streams L to stream coupling processing section 207. Specification section 211 outputs the specified preamble sequences and the preamble sequences input from correlation detection section 209, that is, L preamble sequence numbers to preamble generation section 212.

Preamble generation section 212 generates the plurality of the same number (L) of preamble sequences as the number of multiplexed streams L according to the sequence number input from specification section 211. Preamble generation section 212 outputs the L generated preamble sequences to channel estimation sections 204 of reception processing sections 202-1 to 202-P.

Next, a generation process of preamble sequences in radio transmission apparatus 100 (FIG. 1) and a detection process of preamble sequences in radio reception apparatus 200 (FIG. 2) will be described in detail.

In the following description, the number of antenna ports P of radio transmission apparatus 100 is four. That is, a plurality of streams is transmitted from antenna ports 112-1 to 112-4 of radio transmission apparatus 100. The candidates of the number of multiplexed streams are four candidates of 1, 2, 3, and 4. That is, the number of candidates of the number of multiplexed streams is the same number as the number of antenna ports P. The candidate data of the preamble sequences used by radio transmission apparatus 100 and radio reception apparatus 200 are forty preamble sequences of preamble sequence numbers of 0 to 39. That is, sequence storage section 103 of radio transmission apparatus 100 and sequence storage section 208 of radio reception apparatus 200 shares forty preamble sequences (sequence numbers of 0 to 39).

Accordingly, when the number of antenna ports P of 4 is input, number-of-group determining section 102 determines the number of sequence groups obtained by grouping forty preamble sequences into groups, as four. That is, in number-of-group determining section 102, the same number of groups of 4 as the number of candidates of the number of multiplexed streams is determined.

Then, sequence grouping section 104 first groups the preamble sequences (sequence numbers of 0 to 39) stored in sequence storage section 103 into four sequence groups #1 to #4 on the basis of the number of groups of 4 input from number-of-group determining section 102. For example, as shown in FIG. 3, sequence grouping section 104 uniformly groups the preamble sequences of sequence numbers of 0 to 39 into groups of ten each. Specifically, as shown in FIG. 3, sequence grouping section 104 groups the preamble sequences of the sequence numbers of 0 to 9 into sequence group #1, groups the preamble sequences of sequence numbers 10 to 19 into sequence group #2, groups the preamble sequences of the sequence numbers of 20 to 29 into sequence group #3, and groups the preamble sequences of the sequence numbers of 30 to 39 into sequence group #4.

Sequence grouping section 104 associates sequence groups #1 to #4 with the candidates of 1, 2, 3, and 4 of the number of multiplexed streams, respectively. That is, as shown in FIG. 3, sequence grouping section 104 associates sequence group #1 with the number of multiplexed streams of 1, associates sequence group #2 with the number of multiplexed streams of 2, associates sequence group #3 with the number of multiplexed streams of 3, and associates sequence group #4 with the number of multiplexed streams of 4.

Sequence grouping section 104 forms a sequence set formed of the same number of preamble sequences as the number of multiplexed streams (1, 2, 3, and 4) corresponding to the sequence groups, with respect to the generated sequence groups #1 to #4. Specifically, sequence grouping section 104 forms ten sequence sets formed of one preamble sequence in sequence group #1 corresponding to the number of multiplexed streams of 1. Similarly, sequence grouping section 104 forms five sequence sets formed of two preamble sequences in sequence group #2 corresponding to the number of multiplexed streams of 2. The same is applied to sequence groups #3 and #4. In addition, in each sequence group, the preamble sequence constituting any sequence set is not included in the other sequence sets.

Herein, as an example, Configuration Examples 1 and 2 of the sequence sets of sequence group #2 (the preamble sequences of the sequence numbers #10 to #19 shown in FIG. 3) in sequence grouping section 104 will be described.

Configuration Example 1

In the configuration example, sequence grouping section 104 forms the sequence sets in order from a preamble sequence with a small sequence number in the sequence groups.

Figure 4:
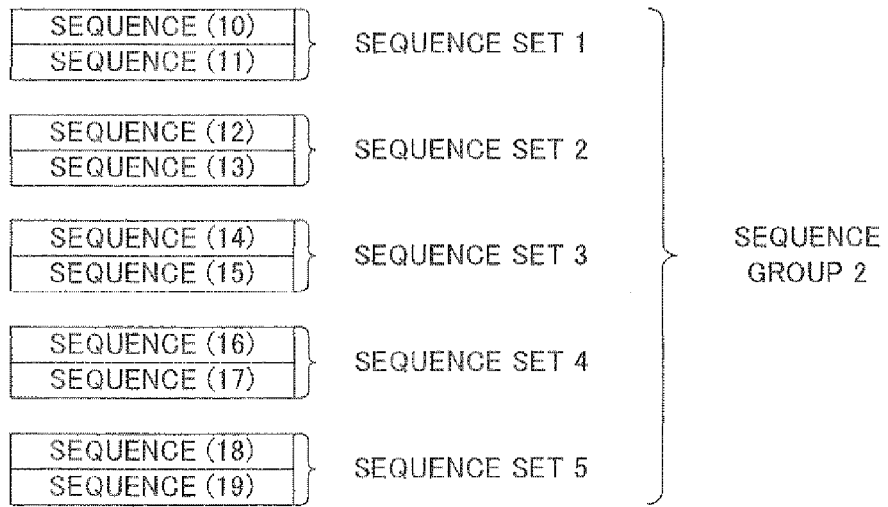
FIG. 4 is a diagram (Configuration Example 1) illustrating a sequence set according to Embodiment 1 of the invention.

Specifically, as shown in FIG. 4, sequence grouping section 104 sequentially selects two sequences from the preamble sequence with the small sequence number, from ten preamble sequences of sequence numbers 10 to 19 included in sequence group #2, and forms one sequence set. That is, as shown in FIG. 4, sequence grouping section 104 selects two preamble sequences of sequence numbers 10 and 11 to form sequence set 1, selects two preamble sequences of the sequence numbers of 12 and 13 to form the sequence set 2, and selects two preamble sequences of the sequence numbers of 14 and 15 to form the sequence set 3. The same is applied to the sequence sets 4 and 5.

As described above, in the configuration example, sequence grouping section 104 forms the sequence set in order of the preamble sequence numbers. Accordingly, in radio transmission apparatus 100 and radio reception apparatus 200, the preamble sequence numbers of the leading of the sequence sets are shared to specify different preamble sequences of the sequence sets, and thus it is possible to share all the information of the sequence sets.

Configuration Example 2

In the configuration example, sequence grouping section 104 forms a plurality of sequence sets such that the preamble sequences with low correlation constitute the same sequence set in the sequence groups.

Herein, a case where the preamble sequences with the sequence numbers close to each other have high correlation (i.e. the distance between the preamble sequences is short), and the preamble sequences with the sequence numbers far from each other have low correlation (i.e. the inter-code distance is long) will be described. For example, in the Walsh code, correlation between spread codes with the same root of spread codes is high.

In the configuration example, sequence grouping section 104 forms the sequence set formed of the preamble sequences, the sequence numbers of which are separated from each other (i.e. the preamble sequences with the low correlation). That is, sequence grouping section 104 according to Configuration Example 1 forms the sequence sets in order of the sequence numbers, but sequence grouping section 104 according to the configuration example interleaves the preamble sequence numbers to form the sequence sets.

Figure 5:
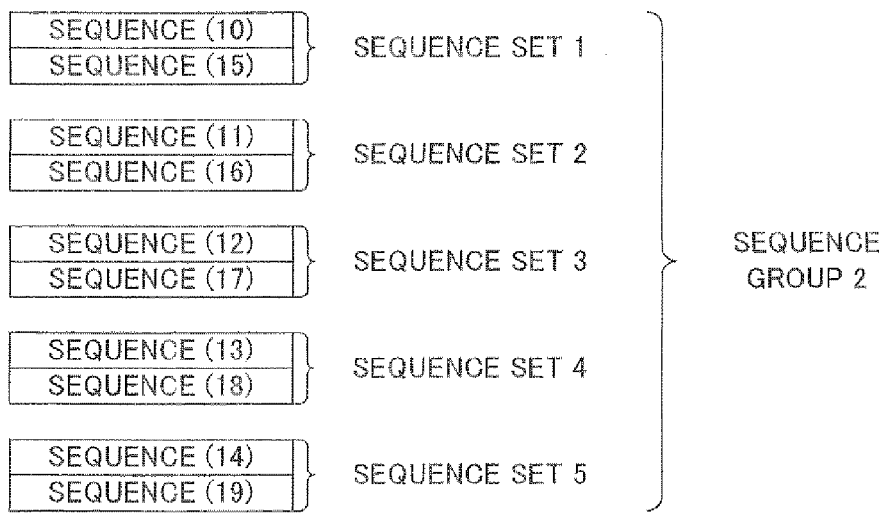
FIG. 5 is a diagram (Configuration Example 2) illustrating a sequence set according to Embodiment 1 of the invention.

Specifically, as shown in FIG. 5, sequence grouping section 104 combines the preamble sequences, the sequence numbers of which are separated by 5 in ten preamble sequences of sequence numbers 10 to 19 included in sequence group #2, to form one sequence set. That is, as shown in FIG. 5, sequence grouping section 104 selects two preamble sequences of sequence numbers 10 and 15 to form sequence set 1, selects two preamble sequences of the sequence numbers of 11 and 16 to form the sequence set 2, and selects two preamble sequences of the sequence numbers of 12 and 17 to form the sequence set 3. The same is applied to the sequence sets 4 and 5. As shown in FIG. 5, two preamble sequence numbers forming each of sequence sets 1 to 5 are separated from each other by 5.

Accordingly, the correlation between the preamble sequences in the sequence set becomes low. Accordingly, radio transmission apparatus 100 assigns the preamble sequences in the sequence set to the other streams, respectively, and thus it is possible to improve detection precision of the preamble sequences in radio reception apparatus 200.

Configuration Examples 1 and 2 of the sequence sets have been described above. In addition, a method of forming the sequence set formed of the same number of preamble sequences as the number of multiplexed streams in each sequence group is not limited to Configuration Examples 1 and 2 described above.

Herein, the ease where the number of multiplexed streams is 2 has been described, but the sequence set is formed in the same manner with respect to the number of multiplexed streams of 1, 3, and 4 (the number of multiplexed streams corresponding to each of sequence groups #1, #3, and #4 shown in FIG. 3).

The sequence groups (e.g. FIG. 3) generated by sequence grouping section 104 and the sequence sets (e.g. FIGS. 4 and 5) are shared by sequence grouping section 104 and sequence group table 210 of radio reception apparatus 200.

Sequence group selection section 105 selects a used preamble sequence according to the number of multiplexed streams L determined by number-of-multiplex determining section 101.

Hereinafter, for example, a case where the number of multiplexed streams L determined by number-of-multiplex determining section 101 is 2 will be described. In this case, sequence group selection section 105 selects sequence group #2 corresponding to the number of multiplexed streams L of 2 from the sequence groups shown in FIG. 3 and generated by the sequence group selection section 104.

Then, preamble generation section 106 selects any one of the sequence sets (sequence sets 1 to 5 shown in FIG. 4 or FIG. 5) in sequence group #2 selected by sequence group selection section 105, and generates the same number (2) of preamble sequences as the number of multiplexed streams L. For example, preamble generation section 106 selects sequence set 1 from sequence sets 1 to 5 in sequence group #2 shown in FIG. 5, and generates two preamble sequences of sequence numbers 10 and 15 constituting sequence set 1.

Radio transmission apparatus 100 transmits two stream data to which two preamble sequences of sequence numbers 10 and 15 are added, to radio reception apparatus 200.

Meanwhile, when the preamble sequences received from radio transmission apparatus 100 are input, correlation detection section 209 of radio reception apparatus 200 takes correlation between the received preamble sequences and the N=40 preamble sequences (preamble sequences of the sequence numbers of 0 to 39 shown in FIG. 3) stored in sequence storage section 208, and detects a preamble sequence with the maximum correlation value. Herein, for example, correlation detection section 209 takes the correlation between the received preamble sequences and forty preamble sequences (sequence numbers 0 to 39), and detect the preamble sequence of sequence number 15 with the maximum sequence number taking the maximum correlation value.

Then, specification section 211 specifies the number of multiplexed streams L corresponding to the sequence group including the preamble sequence (sequence number 15) detected by correlation detection section 209 with reference to the sequence group shown in FIG. 3 and stored in sequence group table 210. Specifically, as shown in FIG. 3, since the sequence group including the preamble sequence of sequence number 15 is sequence group #2, specification section 211 specifies the number of multiplexed streams L of the transmission data transmitted from radio transmission apparatus 100 into 2.

In addition, specification section 211 specifies the preamble sequences other than the preamble sequences (herein, the preamble sequence of sequence number 15) detected by correlation detection section 209 with reference to the sequence sets (e.g. FIG. 4 or FIG. 5) stored in sequence group table 210. Specifically, as shown in FIG. 5, since the preamble sequence of sequence number 15 is included in sequence set 1, specification section 211 specifies the preamble sequence of sequence number 10 as the preamble sequence constituting the same sequence set 1 as the preamble sequence of sequence number 15.

Accordingly, radio reception apparatus 200 obtains L (herein, 2) preamble sequences (the preamble sequence of sequence number 15 detected by correlation detection section 209 and the preamble sequence of sequence number 10 specified by specification section 211) transmitted from radio transmission apparatus 100.

As described above, radio transmission apparatus 100 and radio reception apparatus 200 form the plurality of preamble sequences into the plurality of sequence groups such that the sequence groups correspond to the number of multiplexed streams. Accordingly, when radio reception apparatus 200 can detect at least one of the preamble sequences transmitted from radio transmission apparatus 100, radio reception apparatus 200 can specify the number of multiplexed streams on the basis of the sequence group including the preamble sequence group.

Radio transmission apparatus 100 and radio reception apparatus 200 share the sequence sets formed of the same number of preamble sequences as the number of multiplexed streams corresponding to each sequence group, in each sequence group. Herein, each preamble sequence is set for any one of the plurality of sequence sets, but is not duplicately set for the other sequence sets.

Accordingly, when radio reception apparatus 200 can normally detect the preamble sequence transmitted from any one transmission antenna port, radio reception apparatus 200 can reliably specify the preamble sequences transmitted from the transmission antenna ports other than the transmission antenna port in which the preamble sequence is normally detected.

Figure 6:
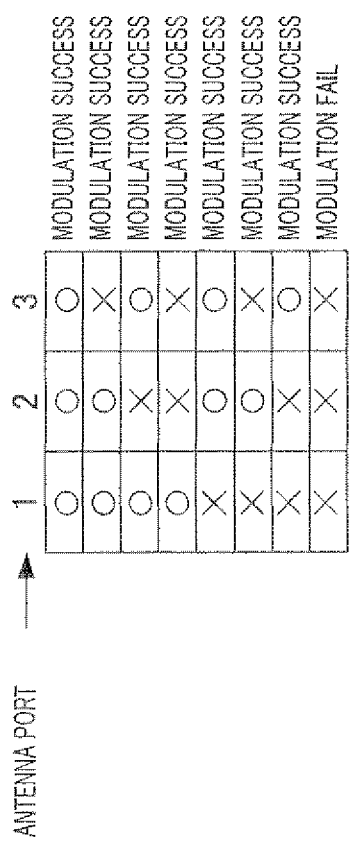
FIG. 6 is a diagram illustrating a demodulation result in the radio reception apparatus according to Embodiment 1 of the invention.

For example, when the number of multiplexed streams L is 3, three preamble sequences are transmitted from antenna ports 1 to 3 (e.g. antenna ports 112-1 to 112-3) of radio transmission apparatus 100. In this case, as shown in FIG. 6, even when radio reception apparatus 200 cannot detect the preamble sequence transmitted from any antenna port (even in the case of "x" shown in FIG. 6), radio reception apparatus 200 can specify the preamble sequence which cannot be detected, with reference to the sequence set on the basis of the normally ("0" shown in FIG. 6) detected preamble sequence. That is, as shown in FIG. 6, when radio reception apparatus 200 can normally (the case of "0" shown in FIG. G) detect at least one of the preamble sequences transmitted from antenna ports 1 to 3 (e.g. antenna ports 112-1 to 112-3) of radio transmission apparatus 100, radio reception apparatus 200 can normally demodulate the data signal (success in demodulation). That is, as shown in FIG. 6, only when radio reception apparatus 200 cannot normally detect the preamble sequences transmitted from all antenna ports 1 to 3 (in the case of all "x" shown at the lowest end of FIG. 6), radio reception apparatus 200 fails to demodulate the data signal. Herein, in FIG. 6, when it is assumed that probability of failing to detect the preamble sequences transmitted from the antenna ports is P, probability of failing to demodulate the data signal in radio reception apparatus 200, that is, probability of failing to detect all the preamble sequences (probability in which all shown at the lowest end of FIG. 6 are "x") becomes P3. That is, the probability of succeeding in demodulation of the data signal in radio reception apparatus 200 becomes 1-P3.

In addition, paying attention to propagation characteristics in a radio communication system, the signals transmitted from the plurality of transmission antenna ports (antenna ports 112-1 to 112-P in FIG. 1) of radio transmission apparatus 100 are received by the reception antenna ports of radio reception apparatus 200 through propagation paths different from each other. For this reason, as described above, the channel quality between radio transmission apparatus 100 and radio reception apparatus 200 is different for each channel (i.e. for each antenna port). Accordingly, the probability in which the channel quality of all the channels is satisfactory is low, and the probability in which only channel quality of several channels is satisfactory is high. That is, a difference occurs in channel quality of channels (between antenna ports).

However, according to the embodiment, in radio reception apparatus 200, when the preamble sequence can be normally detected through at least one channel without depending on the channel quality of the channels (antenna ports), it is possible to reliably specify the number of multiplexed streams L and all the preamble sequences transmitted from radio transmission apparatus 100.

As described above, according to the embodiment, even when the preamble sequence transmitted from any antenna of the radio transmission apparatus is detected, the number of multiplexed streams and the preamble sequences used by the radio transmission apparatus are reliably specified and thus it is possible to normally decode the data signal.

Embodiment 2

In the embodiment, specific digits of sequence number of a plurality of preamble sequences correspond to a plurality of sequence groups, respectively, and a plurality of preamble sequences are grouped into a plurality of sequence groups.

In the following description, as described in Embodiment 1, the number P of antenna ports of radio transmission apparatus 100 (FIG. 1) according to the embodiment is 4, and the candidates of the number of multiplexed streams are four candidates of 1, 2, 3, and 4. As shown in FIG. 7, candidate data of preamble sequences used by radio transmission apparatus 100 and radio reception apparatus 200 (FIG. 2) according to the embodiment are forty preamble sequences of preamble sequence numbers of 00 to 39. That is, as shown in FIG. 7, the preamble sequence numbers are represented by decimal numbers in the double digits.

Sequence grouping section 104 of radio transmission apparatus 100 associates a high-order digit (i.e. on the order of 10's) in the double digits representing the sequence number (00 to 39) of the preamble sequences with the sequence group numbers, and groups the preamble sequences (sequence numbers of 00 to 39) stored in sequence storage section 103 into four sequence groups #1 to #4.

Specifically, as shown in FIG. 7, sequence grouping section 104 groups ten preamble sequences of the sequence numbers of 00 to 09 in which the high-order digit of the sequence number is "0" into sequence group #1. Similarly, as shown in FIG. 7, sequence grouping section 104 groups ten preamble sequences of sequence numbers 10 to 19 in which the high-order digit of the sequence number is "1" into sequence group #2. The same is applied to sequence groups #3 and #4. That is, as shown in FIG. 7, the high-order digits (0, 1, 2, and 3) of the sequence numbers correspond to the group numbers (1, 2, 3, and 4) of the sequence groups, respectively.

Sequence grouping section 104 associates sequence groups #1 to #4 with candidates 1, 2, 3, and 4 of the number of multiplexed streams, in the same manner as Embodiment 1. Sequence grouping section 104 may form sequence sets formed of the same number of preamble sequences as the number of multiplexed streams (1, 2, 3, and 4) corresponding to the sequence groups in the generated sequence groups #1 to #4 in the same manner as Embodiment 1.

Meanwhile, specification section 211 of radio reception apparatus 200 specifies the number of multiplexed streams L corresponding to the sequence group corresponding to the high-order digit from the preamble sequence numbers detected by correlation detection section 209 with reference to the sequence groups shown in FIG. 7 and stored in sequence group table 210. For example, when correlation detection section 209 detects the preamble sequence of sequence number 15 shown in FIG. 7, specification section 211 specifies the number of multiplexed streams L as 2 corresponding to sequence group #2 corresponding to the high-order digit of 1 of sequence number 15, as the number of multiplexed streams used by radio transmission apparatus 100.

Accordingly, radio reception apparatus 200 identifies only a specific digit (herein, the high-order digit of decimal numbers in the double digits) of the received preamble sequence number, and thus can specify the sequence group including the preamble sequence, that is, the number of multiplexed streams.

As described above, according to the embodiment, even when the preamble sequence transmitted from any antenna of the radio transmission apparatus is detected in the same manner as Embodiment 1, it is possible to reliably specify the number of multiplexed streams and to normally decode the data signal. In addition, according to the embodiment, the radio reception apparatus can specify the number of multiplexed streams only by identifying only the specific digit of the detected preamble sequence number, and thus a circuit for searching the number of multiplexed streams can be made with a simpler configuration. In addition, according to the embodiment, the radio reception apparatus identifies only a specific digit of the detected preamble sequence number to specify the number of multiplexed streams, and thus it is possible to specify the number of multiplexed streams at an earlier time and to shorten the process time.

In addition, in the embodiment, it has been described that the preamble sequence number is represented by decimal numbers in the double digits (FIG. 7). However, in the invention, the preamble sequence number is not limited to the decimal numbers in the double digits, and may be, for example, decimal numbers in the triple digits or higher. In addition, in the invention, the preamble sequence number is not limited to the decimal number, and for example, a specific bit of the sequence number represented by binary numbers may correspond to the sequence group. When the specific bit represented by the binary numbers corresponds to the sequence group, a unit of formation of the sequence group becomes a unit of an exponent of 2 and thus design in a digital communication device is easy.

Embodiment 3

In a cellular system, as a terminal (radio transmission apparatus) is positioned closer to the cell center, a propagation loss with respect to a base station (radio reception apparatus) gets lower, and reception quality (e.g. reception SNR (Signal to Noise Ratio), an SINR (Signal to Interference and Noise Ratio), or an RSSI (Received Signal Strength Indicator), etc.) in the base station gets higher.

Herein, the number of multiplexed streams is determined by the number of eigenvalues larger than noise among eigenvalues of a matrix (channel matrix) representing the propagation path (channel) between the radio transmission apparatus (terminal) and the radio reception apparatus (base station). In a reception signal from the radio transmission apparatus (terminal), as the radio transmission apparatus gets closer to the cell center (base station), the noise in the reception signal gets lower, a reception signal level gets higher, and interference from the other cell or interference caused by multi-path gets smaller. Accordingly, as the radio transmission apparatus (terminal) is positioned closer to the cell center, the number of eigenvalues larger than the noise in the channel matrix gets larger, and thus the number of usable multiplexed streams gets larger.

Figure 8:
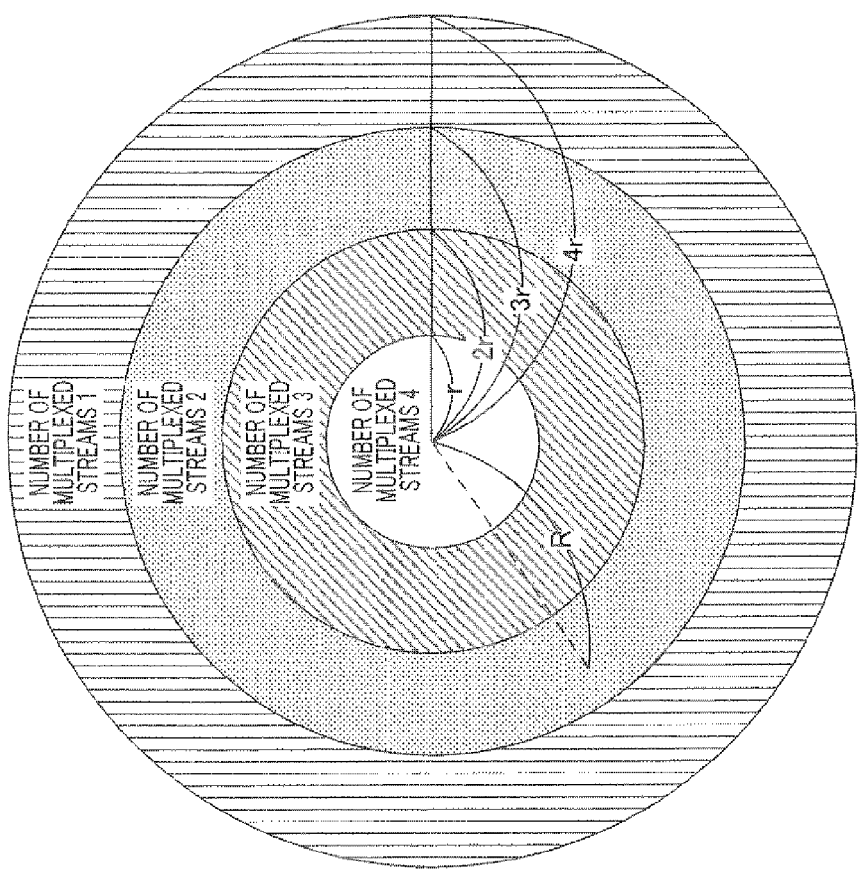
FIG. 8 is a diagram illustrating distribution of radio transmission apparatuses capable of using each number of multiplexed streams in a cell according to Embodiment 3 of the invention.

The number of multiplexed streams L used by the radio transmission apparatus (terminal) is determined according to the distance R from the cell center (base station) from the characteristics. For example, as shown in FIG. 8, when the radio reception apparatus (base station) is the center, the radio transmission apparatus (terminal) positioned within the area of a radius r can use the number of multiplexed streams of 4. Similarly, as shown in FIG. 8, the radio transmission apparatus positioned within an area of radius 2r can use the number of multiplexed streams of 3, the radio transmission apparatus positioned within the area of radius 3r can use the number of multiplexed streams of 2, and the radio transmission apparatus positioned within the area of a radius 4r can use the number of multiplexed streams of 1. That is, as the distance R from the cell center gets longer, the number of usable multiplexed streams gets smaller.

Herein, it is assumed that a plurality of radio transmission apparatuses (terminals) are uniformly distributed in all the areas shown in FIG. 8. In this case, the ratio of the number of radio transmission apparatuses distributed in each area shown in FIG. 8 is represented by the ratio of the dimensions of each area. In this case, paying attention to the distribution of the radio transmission apparatuses (terminals), for example, the radio transmission apparatuses capable of using the number of multiplexed streams of 4 are positioned only within the area (within the radius r) of the number of multiplexed streams of 4 shown in FIG. 8. For this reason, the number of radio transmission apparatuses capable of using the number of multiplexed streams of 4 is small (the area dimensions of the number of multiplexed streams of 4 is small). Meanwhile, since the radio transmission apparatus capable of using the number of multiplexed streams of 1 is positioned in all the areas (within the radius 4r) shown in FIG. 8, the number of radio transmission apparatuses capable of using the number of multiplexed streams of 1 is large.

That is, as the number of multiplexed streams gets smaller, the number of radio transmission apparatuses capable of using the number of multiplexed streams gets larger. That is, as the number of multiplexed streams gets smaller, the number of preamble sequences used corresponding to the number of multiplexed streams gets larger.

In the embodiment, when the plurality of preamble sequences are grouped into the plurality of sequence groups, the number of preamble sequences in the sequence group is increased according to the sequence groups corresponding to a smaller number of multiplexed streams. In other words, the number of preamble sequences in the sequence group is further decreased according to the sequence groups corresponding to the number of multiplexed streams in which the number of usable radio transmission apparatuses is small.

Figure 9:
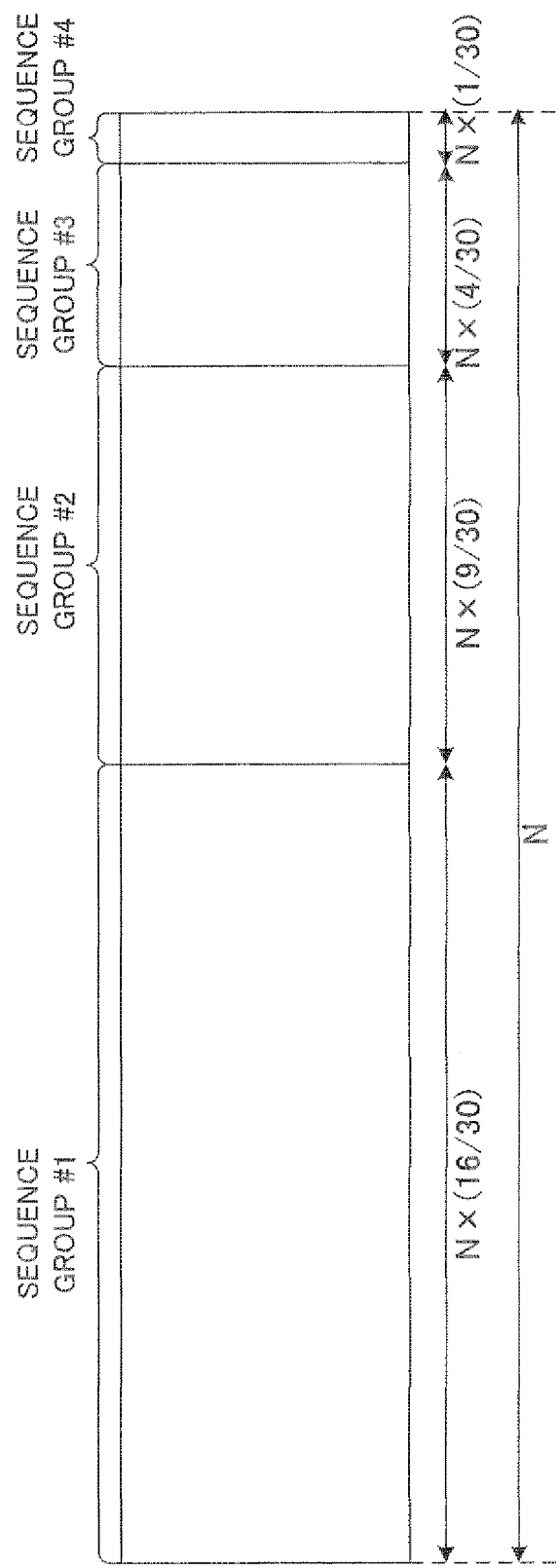
FIG. 9 is a diagram illustrating a sequence group according to Embodiment 3 of the invention.

Hereinafter, the embodiment will be described in detail. In the following description, the number of antenna ports P of radio transmission apparatus 100 (FIG. 1) according to the embodiment is 4 as described in Embodiment 1, and candidates of the number of multiplexed streams are four candidates of 1, 2, 3, and 4. Sequence groups #1 to #4 shown in FIG. 9 correspond to the candidates of 1, 2, 3, and 4 of the number of multiplexed streams, respectively. As shown in FIG. 9, the number of candidate data of the preamble sequences used by radio transmission apparatus 100 (FIG. 1) and radio reception apparatus 200 (FIG. 2) according to the embodiment is N.

Herein, as shown in FIG. 8, a dimension of an area (within radius r) of the number of multiplexed streams of 4 is $\pi r^2$, a dimension of an area (within radius 2r) of the number of multiplexed streams of 3 is $\pi(2r)^2$, a dimension of an area (within radius 3r) of the number of multiplexed streams of 2 is $\pi(3r)^2$, and a dimension of an area (within radius 4r) of the number of multiplexed streams of 1 is $\pi(4r)^2$. Accordingly, in radio transmission apparatus 100 (terminal) positioned in the cell shown in FIG. 8, a ratio of the number of radio transmission apparatuses 100 capable of using the number of multiplexed streams of 1, 2, 3, and 4 is 16:9:4:1.

As described above, the number of radio transmission apparatuses 100 (terminals) positioned in any cell (e.g. FIG. 8) depends on the number of multiplexed streams. Specifically, a small number of radio transmission apparatuses 100 (e.g. radio transmission apparatuses 100 of the number of multiplexed streams of 4 shown in FIG. 8) capable of using a larger number of multiplexed streams are distributed only in the vicinity (e.g. the area within the radius r shown in FIG. 8) of the cell center. Meanwhile, a large number of radio transmission apparatuses 100 (e.g. radio transmission apparatuses 100 of the number of multiplexed streams of 1 shown in FIG. 8) capable of using a smaller number of multiplexed streams are distributed across the cell as a whole (e.g. the area within the radius 4r shown FIG. 8).

Sequence grouping section 104 of radio transmission apparatus 100 groups N preamble sequences stored in sequence storage section 103 into sequence groups #1 to #4, according to the ratio (16:9:4:1) of the number of radio transmission apparatuses 100 (terminals) capable of using the candidates (1, 2, 3, and 4) of each number of multiplexed streams. Specifically, as shown in FIG. 9, sequence grouping section 104 groups (N×16/30) preamble sequences into sequence group #1 corresponding to the number of multiplexed streams of 1, groups (N×9/30) preamble sequences into sequence group #2 corresponding to the number of multiplexed streams of 2, groups (N×4/30) preamble sequences into sequence group #3 corresponding to the number of multiplexed streams of 3, and groups (N×1/30) preamble sequences into sequence group #4 corresponding to the number of multiplexed streams of 4.

That is, sequence grouping section 104 increases the number of preamble sequences in the sequence group, according to the sequence groups corresponding to the candidates of a smaller number of multiplexed streams, in the sequence groups corresponding to the candidates of the number of multiplexed streams. In other words, sequence grouping section 104 decreases the number of preamble sequences in the sequence group, according to the sequence groups corresponding to the candidates of a smaller number of usable radio transmission apparatuses 100, in the sequence groups corresponding to the candidates of the number of multiplexed streams.

As described above, the plurality of preamble sequences are grouped into the plurality of sequence groups according to the number of radio transmission apparatuses 100 capable of using each number of multiplexed streams, and thus N preamble sequences shown in FIG. 9 can be assigned to the plurality of radio transmission apparatuses 100 without waste.

According to the embodiment described above, even when the preamble sequence transmitted from any antenna of the radio transmission apparatus is detected in the same manner as Embodiment 1, the number of multiplexed streams is reliably specified, and thus it is possible to normally decode the data signal. In addition, according to the embodiment, it is possible to assign the preamble sequences without waste to the radio transmission apparatuses (terminals).

Embodiment 4

In Embodiment 3, the number of preamble sequences in the sequence group corresponding to each number of multiplexed streams is determined according to the number of radio transmission apparatuses (terminals) capable of using each number of multiplexed streams. Accordingly, in the embodiment, the number of preamble sequences in the sequence group corresponding to each number of multiplexed streams is determined according to the number of radio transmission apparatuses (terminals) capable of using each number of multiplexed streams and the number of multiplexed streams.

As described above, a larger number of radio transmission apparatuses are distributed as the number of multiplexed streams which can be used by the radio transmission apparatuses gets smaller. However, a large number of radio transmission apparatuses capable of using a smaller number of multiplexed streams are distributed in the cell, but the number of multiplexed streams used by the radio transmission apparatuses gets smaller. That is, a large number of radio transmission apparatuses capable of using a smaller number of multiplexed streams are distributed in the cell, but the number of preamble sequences used by the radio transmission apparatuses is smaller. In other words, a small number of radio transmission apparatuses capable of using a larger number of multiplexed streams are distributed in the cell, but the number of preamble sequences used by the radio transmission apparatuses gets larger.

In the embodiment, the number of preamble sequences in the sequence group corresponding to the candidates of each number of multiplexed streams is determined according to the number of radio transmission apparatuses (terminals) capable of using the candidates of each number of multiplexed streams and each number of multiplexed streams.

Figure 10:
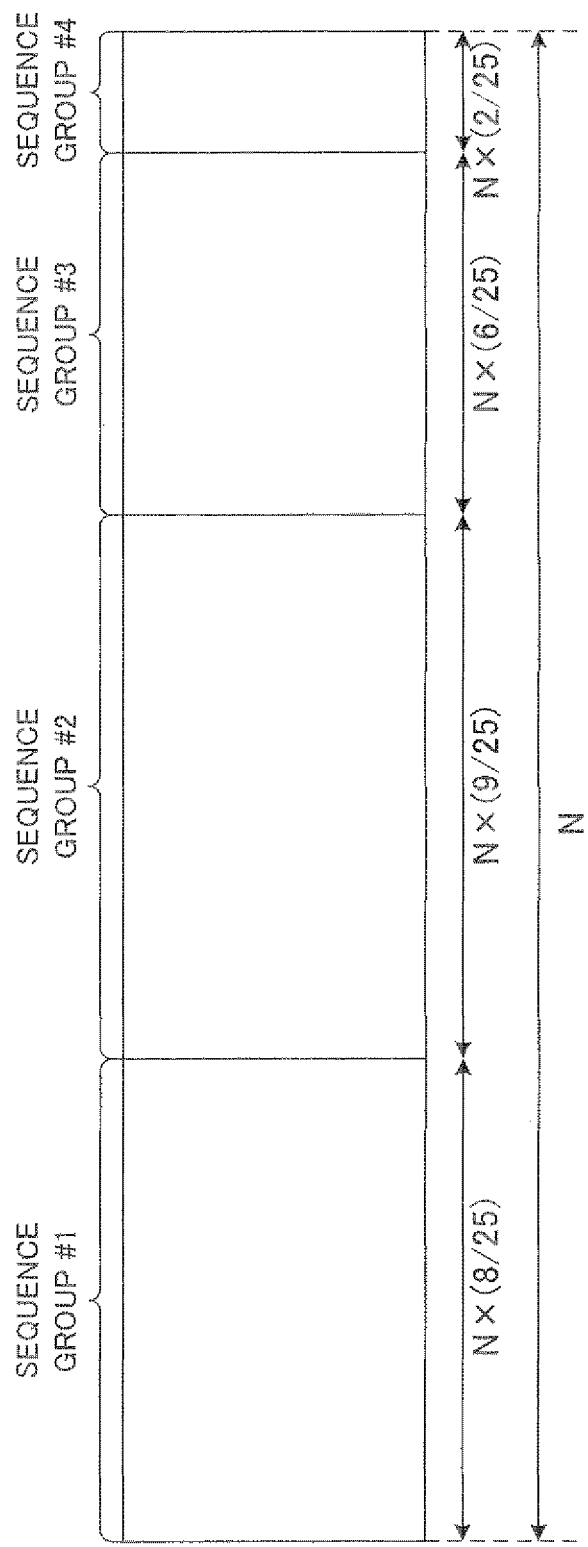
FIG. 10 is a diagram illustrating a sequence group according to Embodiment 4 of the invention.
Figure 1:
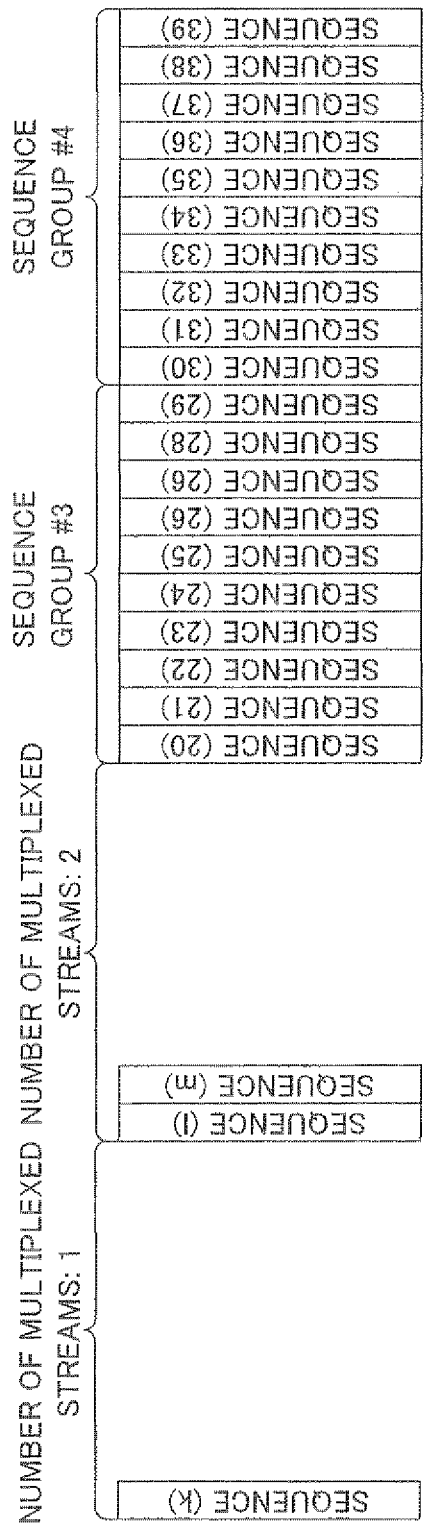

In the following description, as described in Embodiment 1, the number of antenna ports P of radio transmission apparatus 100 (FIG. 1) according to the embodiment is 4, and the candidates of the number of multiplexed streams are four candidates of 1, 2, 3, and 4. Sequence groups #1 to #4 shown in FIG. 10 correspond to the candidates of 1, 2, 3, and 4 of the number of multiplexed streams, respectively. As shown in FIG. 10, the number of candidate data of the preamble sequences used by radio transmission apparatus 100 (FIG. 1) and radio reception apparatus 200 (FIG. 2) according to the embodiment is N in the same manner as Embodiment 3. In addition, the plurality of radio transmission apparatuses 100 (terminals) are uniformly distributed in the cell shown in FIG. 8 in the same manner as Embodiment 3. Accordingly, as shown in FIG. 8, a ratio of the number of radio transmission apparatuses 100 capable of using the number of multiplexed streams of 1, 2, 3, and 4 becomes 16:9:4:1 in the same manner as Embodiment 3.

sequence grouping section 104 of radio transmission apparatus 100 groups N preamble sequences stored in sequence storage section 103 into a plurality of sequence groups according to a ratio obtained by multiplying each number of multiplexed streams by the ratio of the number of radio transmission apparatuses 100 capable of using each number of multiplexed streams.

For example, sequence grouping section 104 calculates a ratio (16:18:12:4) obtained by multiplying each number of multiplexed streams (1, 2, 3, and 4) by the ratio (16:9:4:1) of the number of radio transmission apparatuses 100 (terminals) capable of using the number of multiplexed streams. That is, sequence grouping section 104 calculates a ratio (8:9:6:2) of the number of preamble sequences necessary in the sequence groups (sequence groups #1 to #4 shown in FIG. 10) corresponding to the number of multiplexed streams of 1, 2, 3, and 4. Sequence grouping section 104 determines the number of preamble sequences in the sequence group corresponding to each number of multiplexed streams according to the calculated ratio (8:9:6:2), and groups N preamble sequences into sequence groups #1 to #4.

That is, as shown in FIG. 10, sequence grouping section 104 groups (N×8/25) preamble sequence into sequence group #1 corresponding to the number of multiplexed streams of 1, groups (N×9/25) preamble sequence into sequence group #2 corresponding to the number of multiplexed streams of 2, groups (N×6/25) preamble sequence into sequence group #3 corresponding to the number of multiplexed streams of 3, and groups (N×2/25) preamble sequence into sequence group #4 corresponding to the number of multiplexed streams of 4.

As described above, the plurality of preamble sequences are grouped into the plurality of sequence groups according to the number of preamble sequences necessary in the sequence group corresponding to each number of multiplexed streams, and thus N preamble sequences shown in FIG. 10 can be assigned to the plurality of radio transmission apparatuses 100 further without waste.

Therefore, according to the embodiment, the preamble sequence can be assigned to each radio transmission apparatus (terminal) further without waste as compared with Embodiment 3. Meanwhile, even when the preamble sequence transmitted from any antenna of the radio transmission apparatus is detected in the same manner as Embodiment 1, it is possible to reliably specify the number of multiplexed streams and to normally decode the data signal.

The embodiments have been described above.

In addition, in the embodiments, as a method of sharing the sequence groups and the sequence sets between radio transmission apparatus 100 and radio reception apparatus 200, information representing the sequence groups and the sequence sets may be signaled between radio transmission apparatus 100 and radio reception apparatus 200. The sequence groups and the sequence sets are shared between radio transmission apparatus 100 and radio reception apparatus 200 before the start of communication by signaling, thus it is possible to assign the preamble sequences according to situations of the propagation path, and the detection precision of the preamble sequences in radio reception apparatus 200 is improved. As a method of sharing the sequence groups and the sequence sets between radio transmission apparatus 100 and radio reception apparatus 200, the sequence groups and the sequence sets may be determined in the written standard. Accordingly, the signaling is not necessary for each communication between radio transmission apparatus 100 and radio reception apparatus 200, radio transmission apparatus 100 can transmit the stream-multiplexed data signal to radio reception apparatus 200 without reporting the information representing the sequence groups and the sequence sets in advance.

In the embodiment, it has been described that the sequence groups corresponding to the candidates of all the numbers of multiplexed streams are generated. However, in the invention, the sequence groups corresponding to the candidates of all the numbers of multiplexed streams may not be generated. For example, kinds of terminals of the 3GPP cellular system are separated by classification called category. Specifically, the kinds of terminals are separated by category of terminals handling video streams, pictures, and audio, or category or the like of terminals handling only audio. In the 3GPP cellular system, the invention may be applied to a high-performance terminal (radio transmission apparatus) performing data stream multiplexing such as the terminal handling video streams, and the invention may not be applied to a terminal (radio transmission apparatus) in which the number of multiplexed data streams is small such as the terminal handling only audio. That is, for example, as shown in FIG. 11, when the number of multiplexed streams is small (the case of the number of multiplexed streams of 1 and 2 in FIG. 11), that is, when the number of used preamble sequences is small, the radio transmission apparatus may use an arbitrary preamble sequence (a preamble sequence of a sequence number k or preamble sequences of sequence numbers 1 and m in FIG. 11). Meanwhile, when the number of multiplexed streams is large (the number of multiplexed streams of 3 and 4 in FIG. 11), that is, when the number of used preamble sequences is large, the radio transmission apparatus may group the preamble sequences into groups in the same manner as the embodiments described above. Accordingly, when the number of multiplexed streams is small, the terminal (radio transmission apparatus) does not need to store the information representing the sequence groups and the sequence sets described above in a memory or the like, and thus it is possible to produce the terminal with a low cost.

In the embodiment, it has been described that the preamble sequences are used. That is, in the embodiment, it has been described that the existing signal between the radio transmission apparatus and the radio reception apparatus is added (preamble) to the header of the data part. However, in the invention, the part to which the existing signal is added is not limited to the header of the data signal. For example, even when midamble in which the existing signal is added partway through the data part is used, or even when postamble in which the existing signal is added to the trailing part of the data part is used, the invention may be applied. Herein, when the existing signal is added as preamble in the same manner as the embodiment, the radio reception apparatus can ascertain the situation of the propagation path at the time earlier than the data demodulation time, and thus it is possible to complete the data demodulation at the earlier time. When the existing signal is added as midamble, the radio reception apparatus can ascertain the situation of the propagation path in the vicinity of the center of the data part, and thus it is possible to improve channel estimation precision. When the existing signal is added as postamble, the radio reception apparatus can previously ascertain the situation of the propagation path with respect to the slot transmitted at the next time. In this case, the radio transmission apparatus may select the postamble according to the number of multiplexed streams of a slot transmitted at the next time (or a slot transmitted at the next time and the later).

In the embodiment, it has been described that the number of preamble sequences N used by the radio transmission apparatus and the radio reception apparatus is 40, as an example. However, in the invention, the number of preamble sequences N is not limited to 40, and the invention may be applied to, for example, a case where the number of preamble sequences N is several tens or several thousands.

In the cellular system, the terminals using each number of Multiplexed streams may be changed (e.g. the number of terminals U1 to Um) in the number of multiplexed streams (e.g. the number of multiplexed streams 1 to M) which can be served by the base station of the cell. In the embodiment, the base station (radio reception apparatus) may obtain the relation between the number of multiplexed streams which can be served by the station itself and the number of terminals (radio transmission apparatuses) using the number of multiplexed streams from the plurality of terminals, and may update the information (group table) representing the number of preamble sequences in the vicinity of the sequence group.

Figure 12:
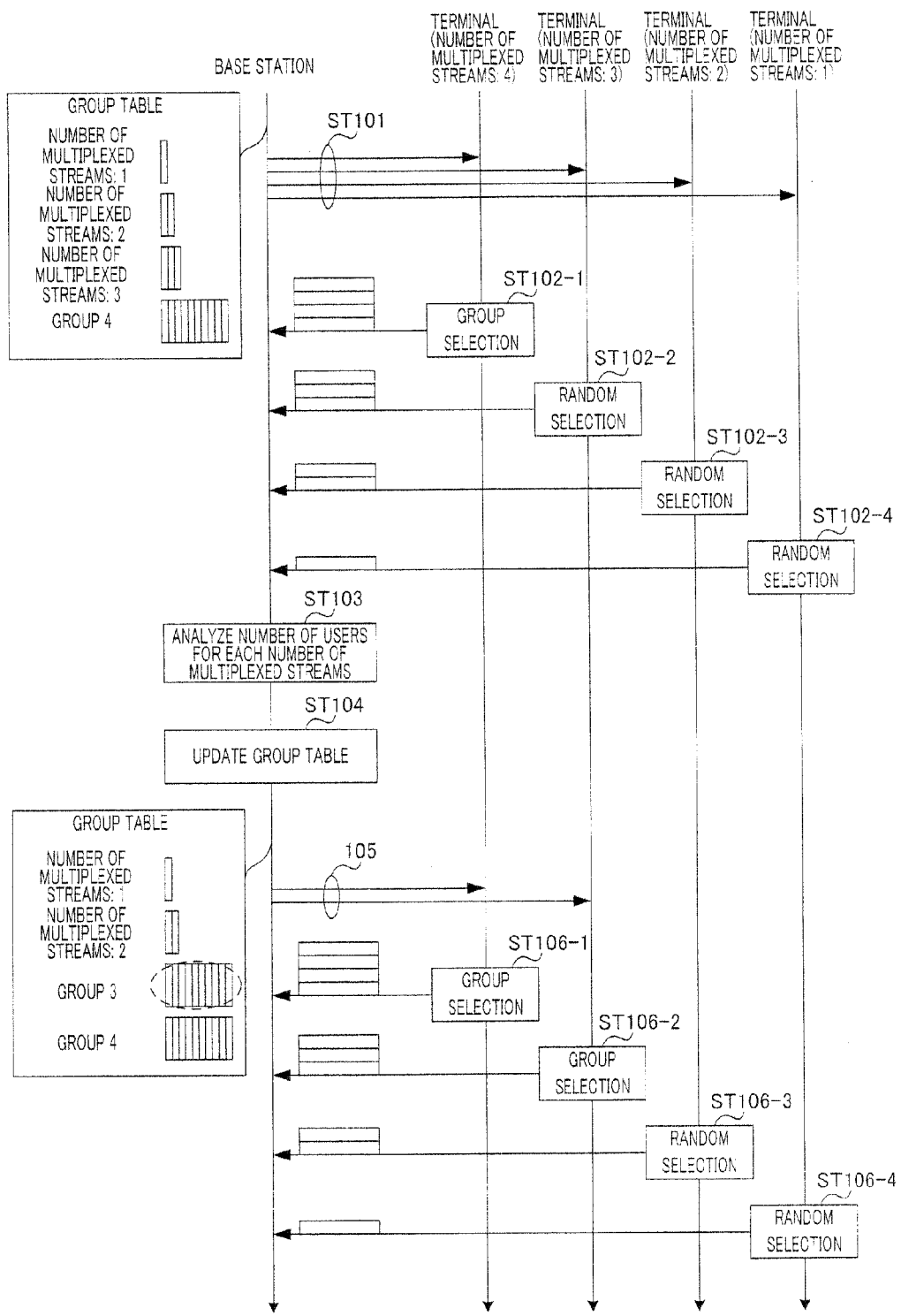
FIG. 12 is a diagram illustrating an update process of a sequence group of the invention.

Specifically, the update process of the information (group table) representing the number of preamble sequences is shown in FIG. 12. In FIG. 12, in Step (hereinafter referred to as "ST") 101, the base station (radio reception apparatus) transmits the group table to the terminals positioned in the cell of the station itself. In the group table shown in FIG. 12, an arbitrary preamble sequence is set for the number of multiplexed streams of 1 to 3, and the sequence group (group 4) grouped into the group and formed of the plurality of preamble sequences is set for the number of multiplexed streams of 4 as described in the embodiments. In ST 102-1, the terminal using the number of multiplexed streams of 4 selects (group selection) four preamble sequences from the preamble sequences in the group 4 in the same manner as the embodiments described above. Meanwhile, in ST 102-2 to ST 102-4, the terminals using the number of multiplexed streams of 3, 2, and 1 randomly select (random selection) the same number of arbitrary preamble sequences as each number of multiplexed streams. In ST 103, the base station analyzes the number of terminals using each number of multiplexed streams on the basis of the received preamble sequences. Herein, the base station determines that the number of terminals using the number of multiplexed streams of 3 is increasing. In ST 104, the base station updates the group table on the basis of the analysis result. Herein, since the number of terminals using the number of multiplexed streams of 3 is increasing, the base station generates the sequence group (group 3) corresponding to the number of multiplexed streams of 3. In ST 105, the base station transmits the updated group table to the terminals using the number of multiplexed streams of 4 and 3. In ST 106-1 and ST 106-2, each of the terminals using the number of multiplexed streams of 4 or 3 selects (group selection) four or three preamble sequences from the preamble sequences in the sequence group 3 or 4 in the same manner as the embodiments. Meanwhile, in ST 106-3 and ST 106-4, each of the terminals using the number of multiplexed streams of 2 or 1 randomly selects (random selection) the same number of arbitrary preamble sequences as each number of multiplexed streams in the same manner as ST 102-3 and ST 102-4. Similarly, the base station updates the number of preamble sequences constituting the sequence group according to the change of the number of terminals using each number of multiplexed streams, thereby smoothly performing the assignment of the preamble sequences.

In the embodiments, the antenna port indicates a theoretical antenna formed of one or a plurality of physical antennas. That is, the antenna port does not necessarily indicate one physical antenna, and may indicate an array antenna or the like formed of a plurality of antennas.

For example, in the 3GPP-LTE, the number of physical antennas constituting the antenna port is not regulated, and is regulated as a minimum unit in which the base station can transmit the other reference signal.

In addition, the antenna port may be regulated as a minimum unit of multiplying the weight of precoding vector.

Also, although cases have been described with the above embodiment as examples where the present invention is configured by hardware, the present invention can also be realized by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-076751, filed on Mar. 26, 2009, including the specification, drawings, and abstract, is incorporated herein by reference in its entirety.

INDUSTRIAL APPLICABILITY

The invention may be applied to a mobile communication system or the like.

REFERENCE SIGNS LIST

100 Radio transmission apparatus
200 Radio reception apparatus
101 Number-of-multiplex determining section 102 Number-of-group determining section
103, 208 Sequence storage section
104 Sequence grouping section
105 Sequence group selection section
106, 212 Preamble generation section
107 Stream division processing section
108 Transmission processing section
109 Modulation section
110 Preamble Addition Section
111 RF transmitting section
112, 201 Antenna port
202 Reception processing section
203 RF receiving section
204 Channel estimation section
205 Preamble removing section
206 Demodulating section
207 Stream coupling processing section
209 Correlation detection section
210 Sequence group table
211 Specification section

The invention claimed is:

1. A radio transmission apparatus comprising:
   a determination section that determines a first number of streams used by the radio transmission apparatus out of candidates for the first number, the streams being spatial multiplexed;
   a grouping section that groups a plurality of preamble sequences into a plurality of groups, a number of the plurality of groups being the same as a number of the candidates, each of the plurality of groups corresponding to each of the candidates for the first number, respectively;
   a selection section that selects a group, from the plurality of groups, corresponding to the determined first number; and
   a generation section that generates preamble sequences used by the radio transmission apparatus, by selecting the same number of preamble sequences as the determined first number in the selected group.

2. The radio transmission apparatus according to claim 1, wherein the grouping section forms a set comprised of the same number of preamble sequences as the first number corresponding to each of the plurality of groups, in each of the plurality of groups.

3. The radio transmission apparatus according to claim 1, wherein the grouping section associates a high-order digit of sequence number of the plurality of preamble sequences with each of the plurality of groups, and groups the plurality of preamble sequences into the plurality of groups.

4. The radio transmission apparatus according to claim 1, wherein the grouping section increases the number of preamble sequences in a group, for the groups corresponding to candidates of a smaller number of streams, in the plurality of groups corresponding to the candidates for the first number.

5. The radio transmission apparatus according to claim 1, wherein the grouping section decreases the number of preamble sequences in a group, for the groups corresponding to candidates of a smaller number of usable radio transmission apparatuses, in the plurality of groups corresponding to the candidates for the first number.

6. The radio transmission apparatus according to claim 1, wherein the grouping section determines a second number of preamble sequences in the groups corresponding to each of candidates for the first number, according to the first number and a third number of radio communication apparatuses that can use each of the candidates for the first number.

7. A radio reception apparatus comprising:
   a detection section that detects preamble sequence transmitted from a radio transmission apparatus; and
   a specification section that specifies, as a first number of streams used by the radio transmission apparatus, a second number of streams corresponding to a group including the detected preamble sequence out of a plurality of groups, the plurality of groups being obtained by grouping a plurality of preamble sequences, a number of the plurality of groups being the same as a number of candidates for the first number, the streams being spatial multiplexed, and each of the plurality of groups corresponding to each of the candidates for the first number, respectively.

8. A preamble sequence generation method comprising:

determining a first number of streams used by a radio transmission apparatus out of candidates for the first number, the streams being spatial multiplexed;

grouping a plurality of preamble sequences into a plurality of groups, a number of the plurality of groups being the same as a number of the candidates, each of the plurality of groups corresponding to each of the candidates for the first number, respectively;

selecting a group, from the plurality of groups, corresponding to the determined first number; and generating preamble sequences used by the radio transmission apparatus, by selecting the same number of preamble sequences as the determined first number in the selected group.

9. A method of specifying a number of streams, comprising:

detecting preamble sequence transmitted from a radio transmission apparatus; and specifying, as a first number of streams used by the radio transmission apparatus, a second number of streams corresponding to a group including the detected preamble sequence out of a plurality of groups, the plurality of groups being obtained by grouping a plurality of preamble sequences, a number of the plurality of groups being the same as a number of candidates for the first number, the stream being spatial multiplexed, and each of the plurality of groups corresponding to each of the candidates for the first number, respectively.

\* \* \* \* \*